US012679332B2

(12) United States Patent
Kang et al.

(10) Patent No.: US 12,679,332 B2
(45) Date of Patent: Jul. 14, 2026

(54) METHOD AND DEVICE FOR CONTROLLING MODE SWITCHING OF HYBRID ELECTRIC VEHICLE, AND VEHICLE

(71) Applicant: GREAT WALL MOTOR COMPANY LIMITED, Baoding (CN)

(72) Inventors: Tong Kang, Baoding (CN); Shujiang Chen, Baoding (CN); Qing Zhao, Baoding (CN); Mingwang Zhou, Baoding (CN); Di Wu, Baoding (CN); Han Liu, Baoding (CN)

(73) Assignee: GREAT WALL MOTOR COMPANY LIMITED, Baoding (CN)

( * ) Notice: Subject to any disclaimer, the term of this patent is extended or adjusted under 35 U.S.C. 154(b) by 323 days.

(21) Appl. No.: 17/927,048

(22) PCT Filed: Jun. 30, 2021

(86) PCT No.: PCT/CN2021/103841
§ 371 (c)(1),
(2) Date: Nov. 22, 2022

(87) PCT Pub. No.: WO2022/007688
PCT Pub. Date: Jan. 13, 2022

(65) Prior Publication Data
US 2023/0202457 A1    Jun. 29, 2023

(30) Foreign Application Priority Data
Jul. 6, 2020    (CN) ......................... 202010643067.2

(51) Int. Cl.
B60W 20/20        (2016.01)
B60W 10/02        (2006.01)
(Continued)

(52) U.S. Cl.
CPC ............ *B60W 20/20* (2013.01); *B60W 10/02* (2013.01); *B60W 10/06* (2013.01); *B60W 10/08* (2013.01);
(Continued)

(58) Field of Classification Search
CPC ...... B60W 20/20; B60W 10/02; B60W 10/06; B60W 10/08; B60W 10/10; B60W 30/182;
(Continued)

(56) References Cited

U.S. PATENT DOCUMENTS

2003/0181276 A1* 9/2003 Minagawa ............. B60K 6/445
2007/0221421 A1* 9/2007 Tanishima ............ B60W 20/15
(Continued)

FOREIGN PATENT DOCUMENTS

CN          102072319 A      5/2011
CN          103758995 A      4/2014
(Continued)

OTHER PUBLICATIONS

International Search Report for PCT /CN2021/103841 issued Oct. 9, 2021.

*Primary Examiner* — Ellis B. Ramirez
(74) *Attorney, Agent, or Firm* — Schmeiser, Olsen & Watts LLP

(57)        ABSTRACT

A method and a device for controlling mode switching of a hybrid electric vehicle, and a vehicle is provided, and belongs to the field of hybrid electric vehicles. The method includes: performing, if the drive state information indicates that a current drive mode of the hybrid electric vehicle is a forward mode of a non-hybrid drive and in a case that a current speed reaches a speed limit, a pre-gear operation when a transmission gear of the hybrid electric vehicle is a neutral gear, to switch the transmission gear from the neutral (Continued)

gear to a second gear. The technical solution provided by the embodiments of the present disclosure can make the hybrid electric vehicle unable to switch to the hybrid drive mode due to the limitation of the ability of synchronizer on gear shifting when driving at a high speed.

16 Claims, 4 Drawing Sheets

(51) Int. Cl.
| | | |
|---|---|---|
| *B60W 10/06* | (2006.01) | |
| *B60W 10/08* | (2006.01) | |
| *B60W 10/10* | (2012.01) | |
| *B60W 30/182* | (2020.01) | |

(52) U.S. Cl.
CPC .......... *B60W 10/10* (2013.01); *B60W 30/182* (2013.01); *B60W 2520/10* (2013.01); *B60W 2710/021* (2013.01)

(58) Field of Classification Search
CPC ....... B60W 2520/10; B60W 2710/021; B60W 2510/101; B60W 2540/16; B60W 10/11; B60W 20/40; B60W 2710/1005; B60K 6/442; Y02T 10/62
USPC .................... 701/22; 180/65.1, 65.21, 65.23; 318/139, 141
See application file for complete search history.

(56) References Cited

U.S. PATENT DOCUMENTS

| | | | | |
|---|---|---|---|---|
| 2007/0227791 | A1* | 10/2007 | Ueno .................... | B60W 10/02 |
| 2007/0278022 | A1* | 12/2007 | Tanishima .............. | B60L 58/12 |
| 2010/0133027 | A1* | 6/2010 | Hung .................... | B60W 20/40 |
| 2012/0022731 | A1* | 1/2012 | Kuang .................... | B60K 6/52 |
| 2012/0053767 | A1* | 3/2012 | Jeon ...................... | B60W 10/02 |
| 2013/0090794 | A1* | 4/2013 | Sung .................... | B60W 10/08 |
| 2013/0253743 | A1* | 9/2013 | Maruyama ............ | B60W 10/02 |
| 2013/0311027 | A1* | 11/2013 | Toyota .................. | B60W 10/11 |
| 2014/0297089 | A1* | 10/2014 | Tsuda .................... | B60W 20/00 |
| 2015/0120106 | A1* | 4/2015 | Yu ............................ | B60K 6/52 |
| 2016/0107632 | A1* | 4/2016 | Yang .................... | B60W 20/30 |
| 2016/0347320 | A1* | 12/2016 | Zhu ...................... | F16H 61/0403 |
| 2017/0334424 | A1* | 11/2017 | Kato .................... | B60W 10/08 |
| 2018/0141426 | A1* | 5/2018 | Tsukizaki .............. | B60W 10/11 |
| 2018/0186362 | A1* | 7/2018 | Koga .................... | B60W 10/06 |
| 2018/0273016 | A1* | 9/2018 | Xu .......................... | H02K 51/00 |
| 2018/0290647 | A1* | 10/2018 | Kang .................... | B60W 20/10 |
| 2019/0152469 | A1* | 5/2019 | Kim .......................... | B60K 6/52 |
| 2020/0384978 | A1* | 12/2020 | Abe ...................... | B60K 6/485 |

FOREIGN PATENT DOCUMENTS

| | | | |
|---|---|---|---|
| CN | 104002814 | A | 8/2014 |
| CN | 106335500 | A | 1/2017 |
| CN | 107202161 | A | 9/2017 |
| CN | 107284433 | A | 10/2017 |
| CN | 107949730 | A | 4/2018 |
| CN | 108099894 | A | 6/2018 |
| CN | 106335500 | B | 11/2018 |
| CN | 109606350 | A | 4/2019 |
| CN | 111284476 | A | 6/2020 |
| DE | 102014225193 | A1 | 6/2016 |
| EP | 2832569 | A1 | 2/2015 |
| EP | 3305615 | A1 | 4/2018 |
| JP | 2000220732 | A | 8/2000 |
| JP | 2015000675 | A | 1/2015 |
| JP | 2015229488 | A * | 12/2015 |

* cited by examiner

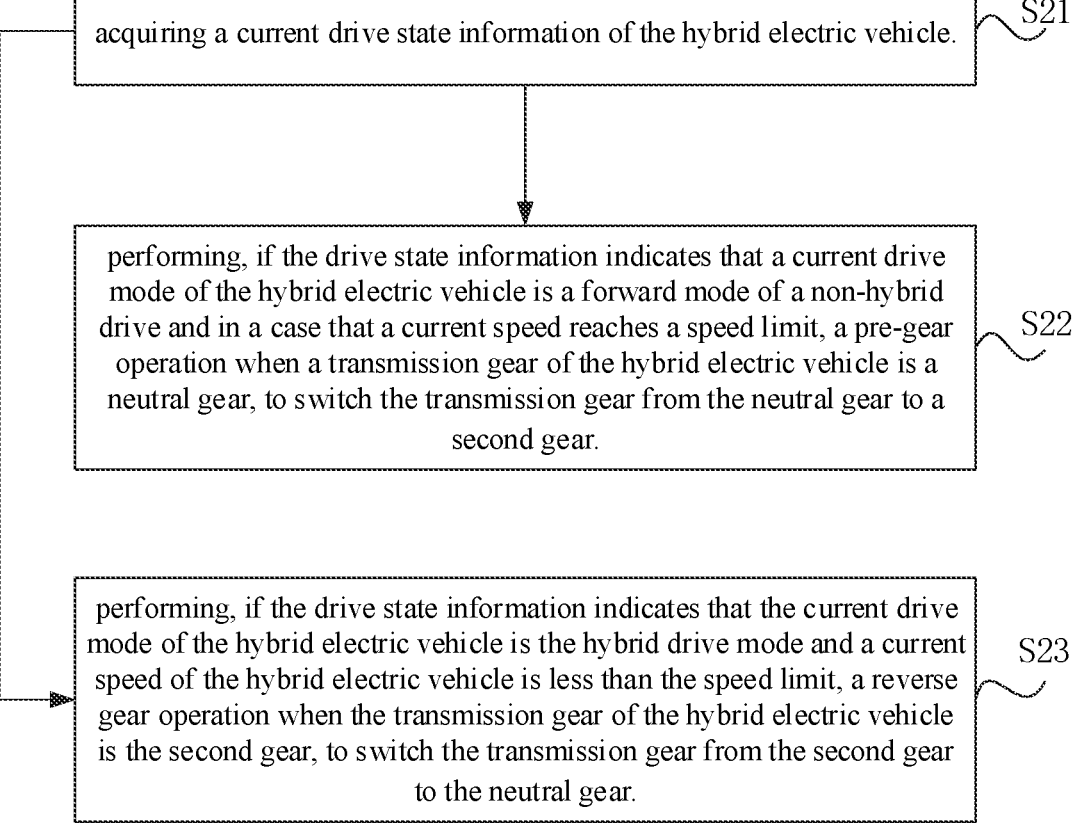

acquiring a current drive state information of the hybrid electric vehicle. ~S21 performing, if the drive state information indicates that a current drive mode of the hybrid electric vehicle is a forward mode of a non-hybrid drive and in a case that a current speed reaches a speed limit, a pre-gear operation when a transmission gear of the hybrid electric vehicle is a neutral gear, to switch the transmission gear from the neutral gear to a second gear. ~S22 performing, if the drive state information indicates that the current drive mode of the hybrid electric vehicle is the hybrid drive mode and a current speed of the hybrid electric vehicle is less than the speed limit, a reverse gear operation when the transmission gear of the hybrid electric vehicle is the second gear, to switch the transmission gear from the second gear to the neutral gear. S23

METHOD AND DEVICE FOR CONTROLLING MODE SWITCHING OF HYBRID ELECTRIC VEHICLE, AND VEHICLE

CROSS-REFERENCE TO RELATED APPLICATIONS

This application claims priority to PCT/CN2021/103841, having a filing date of Jun. 30, 2021, which is based on Chinese Patent Application No. 202010643067.2, having a filing date of Jul. 6, 2020, the entire contents both of which are hereby incorporated by reference.

FIELD OF TECHNOLOGY

The following relates to the field of hybrid electric vehicles, and more particularly to a method and a device for controlling mode switching of a hybrid electric vehicle, and a vehicle.

BACKGROUND

In the field of hybrid electric vehicles related to the two-gear dedicated hybrid transmission (DHT), the vehicle can achieve switching between multiple operating modes, including a pure electric drive mode, a series drive mode and a hybrid drive mode that can achieve automatic switching. Automatic switching between drive modes can be realized through the control of a transmission control unit.

The vehicle control unit (VCU) determines the best operation mode of the vehicle according to the power demand of the driver for driving the vehicle and the state (vehicle speed, power of the traction battery and other factors) of the vehicle. Under the pure electric drive mode and the series drive mode, the engine and transmission are not directly involved in driving the vehicle, and the vehicle is only driven by the drive motor. Under the hybrid drive mode, the engine transmits power directly to the wheels through the transmission. Therefore, under the operating conditions of the pure electric drive mode or the series drive mode, if switching to the hybrid drive mode, it is necessary to perform the gear shifting of the synchronizer and the engagement of the clutch of the transmission.

While in the gear shifting of the synchronizer, it is necessary to has certain restrictions on the speed difference at both ends of the synchronizer, if the vehicle speed is higher, the synchronizer will directly perform the gear shifting at high speed, which will be impossible to complete due to excessive speed difference. That is to say, if the drive mode switching is required at high speed, it may not be realized due to the limitation of the ability of the synchronizer.

SUMMARY

An aspect relates to a method and a device for controlling mode switching of a hybrid electric vehicle, and a vehicle, in order to solve the problem that the drive mode switching of vehicle in the existing related technologies may not be realized due to the limitation of the ability of the synchronizer.

In order to realize above-mentioned aspect, the present disclosure provides a method for controlling mode switching of a hybrid electric vehicle, and the method includes:

acquiring, through a vehicle control unit, a current drive state information of the hybrid electric vehicle;

performing, through a processor, if the drive state information indicates that a current drive mode of the hybrid electric vehicle is a forward mode of a non-hybrid drive and in a case that a current speed reaches a speed limit, a pre-gear operation when a transmission gear of the hybrid electric vehicle is a neutral gear, to switch the transmission gear from the neutral gear to a second gear; and switching, through a transmission control unit, if the drive state information meets preset switching conditions of drive modes, the hybrid electric vehicle from the non-hybrid drive mode to a hybrid drive mode when the transmission gear of the hybrid electric vehicle is the second gear.

In an embodiment, the method further includes:

performing, if the drive state information indicates that the current drive mode of the hybrid electric vehicle is the hybrid drive mode and a current speed of the hybrid electric vehicle is less than the speed limit, a reverse gear operation when the transmission gear of the hybrid electric vehicle is the second gear, to switch the transmission gear from the second gear to the neutral gear.

In an embodiment, the hybrid electric vehicle includes a transmission control unit and an electronic stability program, and the step of acquiring a current drive state information of the hybrid electric vehicle includes:

determining a current drive mode of the hybrid electric vehicle and a gear information under the current drive mode according to an electric signal of the transmission control unit; and determining a current vehicle speed and a current vehicle demand power of the hybrid electric vehicle according to an electric signal of the electronic stability program, wherein the drive state information comprises the current drive mode, the gear information, the current vehicle speed and the current vehicle demand power, and the current vehicle demand power is configured to determine whether a current vehicle needs to switch to the hybrid drive mode;

the switching conditions of drive modes are that the drive state information indicates that the hybrid electric vehicle is in the forward mode of the non-hybrid drive, a current vehicle speed is in a preset speed range, and a current vehicle demand power is in an economic operation range.

In an embodiment, the hybrid electric vehicle includes a transmission control unit, an electronic stability program and synchronizer electrically connected with the transmission control unit, and the step of performing a pre-gear operation includes:

sending a pre-gear command to the transmission control unit, and the pre-gear command is configured to instruct the transmission control unit to control the synchronizer to perform the pre-gear operation.

In an embodiment, the method further includes:

re-sending the pre-gear command to the transmission control unit when a gear failure message sent by the transmission control unit in response to the pre-gear command is received.

In an embodiment, the speed limit is determined by:

acquiring a preset maximum speed difference in a synchronizer of the hybrid electric vehicle; and setting the speed limit according to the maximum speed difference, such that when the vehicle speed of the hybrid electric vehicle reaches the speed limit, a speed difference at both ends of the synchronizer is less than the maximum speed difference.

In an embodiment, the hybrid electric vehicle includes a transmission control unit and a clutch electrically connected with the transmission control unit; and the step of switching the hybrid electric vehicle from a non-hybrid drive mode to a hybrid drive mode includes:

sending a mode switching command to the transmission control unit, and the mode switching command is configured to instruct the transmission control unit to control an engagement of the clutch with an engine of the hybrid electric vehicle to complete an operation of switching from a pure electric drive mode or a series drive mode to a hybrid electric drive mode.

The present disclosure further provides a device for controlling mode switching of a hybrid electric vehicle, and the device includes:

an acquisition module, configured for acquiring, though a vehicle control unit, a current drive state information of the hybrid electric vehicle;

a processor, configured for performing, if the drive state information indicates that a current drive mode of the hybrid electric vehicle is a forward mode of a non-hybrid drive and in a case that a current speed reaches a speed limit, a pre-gear operation when a transmission gear of the hybrid electric vehicle is a neutral gear, to switch the transmission gear from the neutral gear to a second gear; and a switching module, configured for switching, through a transmission control unit, if the drive state information meets preset switching conditions of drive modes, the hybrid electric vehicle from the non-hybrid drive mode to a hybrid drive mode when the transmission gear of the hybrid electric vehicle is the second gear.

In an embodiment, the step of acquiring, through the vehicle control unit of the device, a current drive state information of the hybrid electric vehicle includes:

determining a current drive mode of the hybrid electric vehicle and a gear information under the current drive mode according to an electric signal of the transmission control unit; and determining a current vehicle speed and a current vehicle demand power of the hybrid electric vehicle according to an electric signal of the electronic stability program, wherein the drive state information comprises the current drive mode, the gear information, the current vehicle speed and the current vehicle demand power, and the current vehicle demand power is configured to determine whether a current vehicle needs to switch to the hybrid drive mode;

the switching conditions of drive modes are that the drive state information indicates that the hybrid electric vehicle is in the forward mode of the non-hybrid drive, a current vehicle speed is in a preset speed range, and a current vehicle demand power is in an economic operation range.

In an embodiment, the step of performing, through the processor of the device, a pre-gear operation includes:

sending a pre-gear command to the transmission control unit, wherein the pre-gear command is configured to instruct the transmission control unit to control the synchronizer to perform the pre-gear operation.

In an embodiment, the processor is further configured for re-sending the pre-gear command to the transmission control unit when a gear failure message sent by the transmission control unit in response to the pre-gear command is received.

In an embodiment, the speed limit is determined by:

acquiring a preset maximum speed difference in a synchronizer of the hybrid electric vehicle; and setting the speed limit according to the maximum speed difference, such that when the vehicle speed of the hybrid electric vehicle reaches the speed limit, a speed difference at both ends of the synchronizer is less than the maximum speed difference.

In an embodiment, the step of switching, through the transmission control unit, the hybrid electric vehicle from the non-hybrid drive mode to a hybrid drive mode includes:

sending a mode switching command to the transmission control unit, wherein the mode switching command is configured to instruct the transmission control unit to control an engagement of the clutch with an engine of the hybrid electric vehicle to complete an operation of switching from a pure electric drive mode or a series drive mode to a hybrid electric drive mode.

In an embodiment, the transmission control unit is further configured for:

performing, if the drive state information indicates that the current drive mode of the hybrid electric vehicle is the hybrid drive mode and a current speed of the hybrid electric vehicle is less than the speed limit, a reverse gear operation when the transmission gear of the hybrid electric vehicle is the second gear, to switch the transmission gear from the second gear to the neutral gear.

The present disclosure provides a hybrid electric vehicle, and the hybrid electric vehicle includes a transmission control unit, an electronic stability program and a device for controlling mode switching electrically connected with the transmission control unit and the electronic stability program, and the device for controlling mode switching is configured for implementing the method for controlling mode switching of a hybrid electric vehicle mentioned above.

With the above technical solution, the following effects can be achieved at least:

Compared with the conventional art, the vehicle control unit sends a mode switching command when detecting that the vehicle needs to perform mode switching, the mode switching command is configured to indicate the gear shifting of the synchronizer and the engagement of the clutch of the transmission control unit, after the gear shifting is successful, the drive mode of the vehicle is switched. However, the current vehicle speed may have exceeded the limitation of the speed difference at both ends of the synchronizer, which may cause the synchronizer to fail to engage a gear, therefore, the switching of vehicle operation mode fails.

When the vehicle reaches the standard value (that is, the above speed limit) of the system set based on the maximum speed difference acceptable to the synchronizer, the present disclosure sends a pre-gear command to control the transmission for pre-gear operating. In this way, when the vehicle is driving at a high speed and the drive state needs to switch to the hybrid power mode, the mode switching action can be directly carried out without further gear shifting. The case that the failure of gear shifting caused by the limitation of the ability of the synchronizer is avoided, the normal mode switching when the vehicle is running at high speed is ensured, and the vehicle performance is improved.

BRIEF DESCRIPTION

Some of the embodiments will be described in detail, with references to the following Figures, wherein like designations denote like members, wherein:

FIG. 2 is another flow chart of a method for controlling mode switching of a hybrid electric vehicle;

DETAILED DESCRIPTION

The specific embodiments of the present disclosure are described in detail below in combination with the accompanying drawings. It should be understood that the specific embodiments described herein are only used to explain and interpret the disclosure and are not used to limit the disclosure.

In order to enable ordinary technicians in the art to quickly understand the improvement of the technical solution provided by the embodiments of the present disclosure compared with the conventional art, the following first introduces the method for controlling mode switching of a hybrid electric vehicle in the relevant technology, in which the hybrid electric vehicle can be a hybrid vehicle equipped with a two-gear dedicated hybrid transmission (DHT).

The vehicle can realize switching between multiple operating modes, including a pure electric drive mode, a series drive mode and a hybrid drive mode. Each drive mode can be automatically switched through controller control to improve the power and economy of the vehicle.

The vehicle control unit (VCU) determines the best operation mode of the vehicle according to the power demand of the driver for driving the vehicle and the state (vehicle speed, power of the traction battery and other factors) of the vehicle. Under the pure electric drive mode and the series drive mode, the engine and transmission are not directly involved in driving the vehicle, and the vehicle is only driven by the drive motor. Under the hybrid drive mode, the engine transmits power directly to the wheels through the transmission. Therefore, under the operating conditions of the pure electric drive mode or the series drive mode, if switching to the hybrid drive mode, it is necessary to perform the gear shifting of the synchronizer and the engagement of the clutch of the transmission.

While in the gear shifting of the synchronizer, it is necessary to has certain restrictions on the speed difference at both ends of the synchronizer, if the vehicle speed is higher, the synchronizer will directly perform the gear shifting at high speed, which will be impossible to complete due to excessive speed difference. That is to say, when the vehicle is driving at a high speed, the vehicle is not able to be switched to the hybrid drive mode due to limitation of the ability of the synchronizer.

Figure 1:
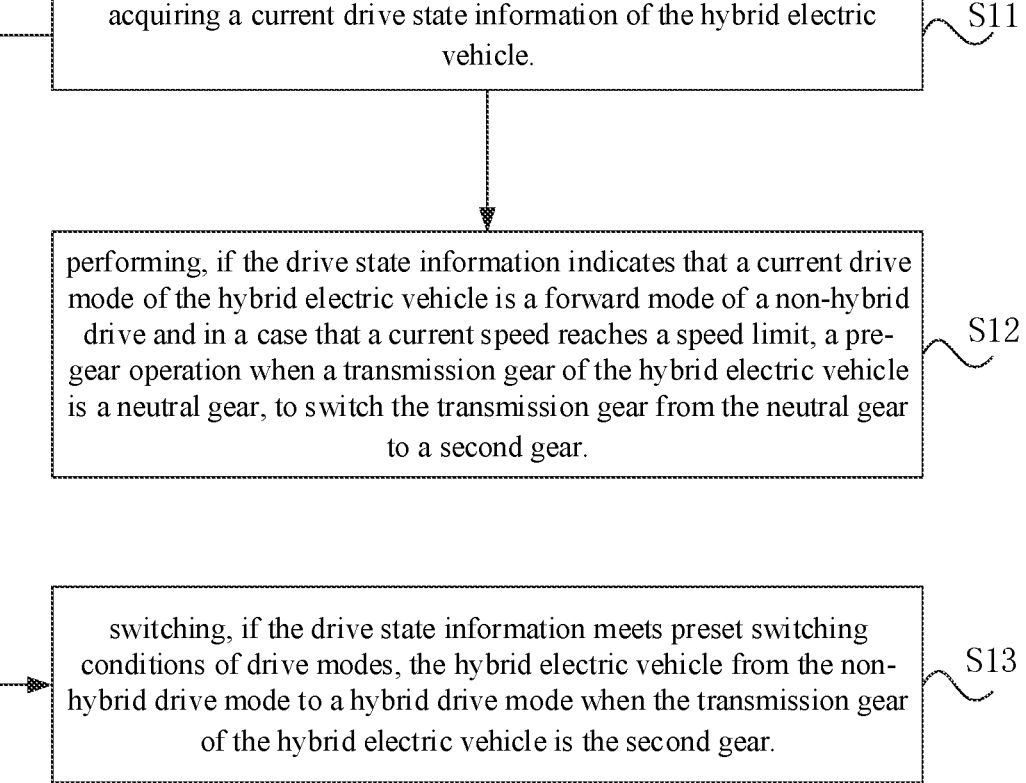
FIG. 1 is a flow chart of a method for controlling mode switching of a hybrid electric vehicle.

In order to solve the above technical problems, the embodiment of the present disclosure provides a method for controlling mode switching of a hybrid electric vehicle. For example, the method can be applied to the VCU of the hybrid electric vehicle, as shown in FIG. 1. The method includes:

S11, acquiring a current drive state information of the hybrid electric vehicle.

The drive state information can include the drive modes of the current vehicle in the current gear, the gear information under the current drive mode, the current vehicle speed and the current vehicle demand power. The vehicle demand power can include the drive demand power and the demand power of electrical accessories. The drive demand power can be the electrical signal acquired by the vehicle control unit by converting the travel of the accelerator pedal and brake pedal, the drive demand power of the vehicle under the current working condition is calculated according to the electric signal; the demand power of electrical accessories can be determined by the vehicle control unit based on the working state of each electrical accessory on the vehicle.

S12, performing, if the drive state information indicates that a current drive mode of the hybrid electric vehicle is a forward mode of a non-hybrid drive and in a case that a current speed reaches a speed limit, a pre-gear operation when a transmission gear of the hybrid electric vehicle is a neutral gear, to switch the transmission gear from the neutral gear to a second gear.

Taking the two-gear DHT as an example, the transmission gears include a neutral gear, a first gear and a second gear. The above speed limit can be the speed value that is pre calibrated to match the second gear, that is, when the vehicle speed reaches the speed value, the transmission gear can be smoothly switched from neutral gear to second gear. In addition, the drive modes of the hybrid electric vehicle can include a hybrid drive mode, a series drive mode and a pure electric drive mode.

S13, switching, if the drive state information meets preset switching conditions of drive modes, the hybrid electric vehicle from the non-hybrid drive mode to a hybrid drive mode when the transmission gear of the hybrid electric vehicle is the second gear. The switching conditions of preset drive modes can be that when the vehicle speed increases to a certain range, the driver does not need strong power, and the conditions of engine operation and economic zone are just meet.

That is, the technical solution of the embodiment of the present disclosure adds a speed limit for the condition of controlling mode switching, so that the vehicle can perform the pre-gear operation when the vehicle reaches the speed limit, and when the vehicle speed is higher than the speed limit and the vehicle is necessary to switch to the hybrid power drive mode, the synchronizer has been in gear, and the clutch can be directly engaged, Thus, the failure of mode switching caused by the inability to engage a gear will not occur due to the limitation of the ability of the synchronizer, and the power performance and economy of the vehicle are effectively improved.

In an embodiment, on the basis of the method shown in FIG. 1, the step of acquiring a current drive state information of the hybrid electric vehicle includes:

determining a current drive mode of the hybrid electric vehicle and a gear information under the current drive mode according to an electric signal of the transmission control unit; and determining a current vehicle speed and a current vehicle demand power of the hybrid electric vehicle according to an electric signal of the electronic stability program, wherein the drive state information comprises the current drive mode, the gear information, the current vehicle speed and the current vehicle demand power, and the current vehicle demand power is configured to determine whether a current vehicle needs to switch to the hybrid drive mode;

the switching conditions of drive modes are that the drive state information indicates that the hybrid electric vehicle is in the forward mode of the non-hybrid drive, a current vehicle speed is in a preset speed range, and a current vehicle demand power is in an economic operation range. At this time, switching to the hybrid battery can ensure the economy of vehicle operation on the premise of ensuring vehicle power.

In an embodiment, the step of performing a pre-gear operation includes:

sending a pre-gear command to the transmission control unit, and the pre-gear command is configured to instruct the transmission control unit to control the synchronizer to perform the pre-gear operation.

In an embodiment, when a gear failure message sent by the transmission control unit in response to the pre-gear command is received, the pre-gear command to the transmission control unit is re-sent. Therefore, the gear operation can be re-performed in a timely manner in case of a gear failure to avoid mode switching failure.

In an embodiment, the speed limit is determined by:

acquiring a preset maximum speed difference in a synchronizer of the hybrid electric vehicle; and setting the speed limit according to the maximum speed difference, such that when the vehicle speed of the hybrid electric vehicle reaches the speed limit, a speed difference at both ends of the synchronizer is less than the maximum speed difference. At this time, it not only ensures that the vehicle is engaged a gear at the speed within the allowable range of the ability of the synchronizer, but also avoids frequent gear shifting caused by too small speed limit.

In an embodiment, the step of switching the hybrid electric vehicle from the non-hybrid drive mode to a hybrid drive mode includes:

sending a mode switching command to the transmission control unit, and the mode switching command is configured to instruct the transmission control unit to control an engagement of the clutch with an engine of the hybrid electric vehicle to complete an operation of switching from a pure electric drive mode or a series drive mode to a hybrid electric drive mode.

In order for those skilled in the art to further understand the method for controlling mode switching provided by the embodiments of the present disclosure, the method for controlling mode switching of a hybrid electric vehicle in the embodiments of the present disclosure is described in detail below:

FIG. 2 is another flow chart of a method for controlling mode switching provided by the embodiment of the present disclosure, as shown in the FIG. 2, which includes:

S21, acquiring a current drive state information of the hybrid electric vehicle.

S22, performing, if the drive state information indicates that a current drive mode of the hybrid electric vehicle is a forward mode of a non-hybrid drive and in a case that a current speed reaches a speed limit, a pre-gear operation when a transmission gear of the hybrid electric vehicle is a neutral gear, to switch the transmission gear from the neutral gear to a second gear.

S23, performing, if the drive state information indicates that the current drive mode of the hybrid electric vehicle is the hybrid drive mode and a current speed of the hybrid electric vehicle is less than the speed limit, a reverse gear operation when the transmission gear of the hybrid electric vehicle is the second gear, to switch the transmission gear from the second gear to the neutral gear.

During specific implementation, the conditions for performing reverse gear can be as follows: the drive state information indicates that the current drive mode of the hybrid electric vehicle is hybrid drive mode, and the current speed of the hybrid electric vehicle is less than the speed limit of the vehicle and keeps for 3 seconds. In which, the 3 seconds can be a manually set time, which is not limited in the embodiments of the present disclosure.

With the above method, when the current vehicle speed of the vehicle is less than the speed limit of the vehicle, the transmission gear can be returned to the neutral gear, which prevents the vehicle from switching to hybrid drive mode when driving at low speed, while the transmission gear of the vehicle is still at a high gear. The engine is easy to generate carbon deposits when the vehicle is driving at a high gear and low speed, which is conducive to the service life of the engine.

Figure 3:
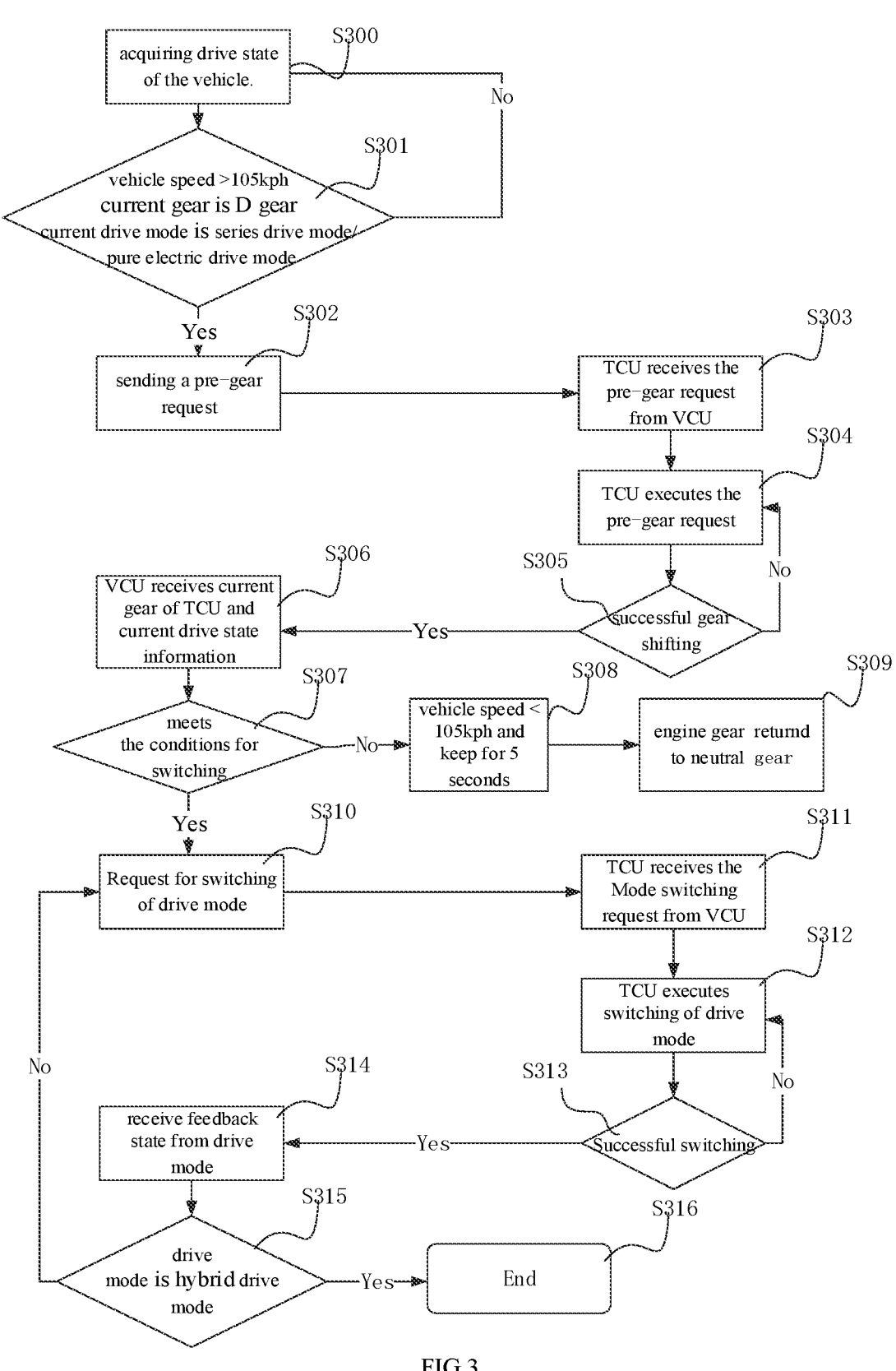
FIG. 3 is yet flow chart of a method for controlling mode switching of a hybrid electric vehicle.

FIG. 3 is a yet flow chart of a method for controlling mode switching provided by the embodiment of the present disclosure, in which the speed limit is set to 105 kph (km/h), the hybrid electric vehicle is a hybrid electric vehicle equipped with a two-gear DHT, and the vehicle has three drive modes, including a pure electric drive mode, a series drive mode, and a hybrid drive mode. In which, the VCU represents the vehicle control unit, the TCU represents the transmission control unit, and D-gear represents that the vehicle is in forward gear.

According to steps S300, S301, S302, S303, S304, S305, S306, S307, S308, and S309 shown in FIG. 3, when the vehicle is successfully engaged a gear, if the vehicle drive state does not meet the conditions for switching to hybrid drive mode and the vehicle speed is below 105 kph for more than 5 seconds, the transmission gear will return to neutral gear, which prevents the vehicle from switching to hybrid drive mode when driving at low speed, while the transmission gear of the vehicle is still at a high gear. The engine is easy to generate carbon deposits when the vehicle is driving at a high gear and low speed, which is conducive to the service life of the engine.

According to steps S300, S301, S302, S303, S304, S305, S306, S307, S310, S311, S312, S313, S314, S315, and S316 shown in FIG. 3, when the current vehicle speed is greater than the preset speed limit, the current vehicle drive mode is the series drive mode or the pure electric drive mode and the current vehicle is in a forward gear, the vehicle controller sends a pre-gear request, and the transmission control unit receives the pre-gear request and executes the pre-gear request, If the drive state of the vehicle meets the conditions for switching to the hybrid drive mode after successful gear shifting, the vehicle control unit sends the mode switching command, and the transmission control unit receives and executes the mode switching command. The whole mode switching process is ended after successful switching. It also includes the feedback mechanism of steps S304, S305, S312 and S313 to ensure that the pre-gear request and drive mode switching request sent by the vehicle control unit are fully implemented.

Figure 4:
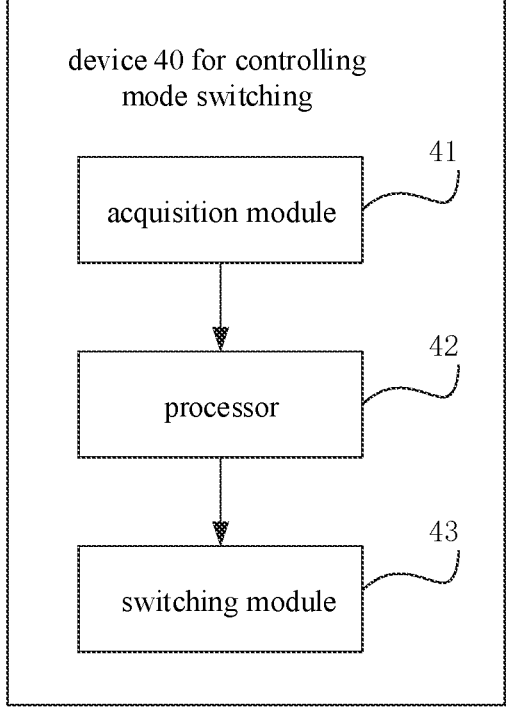
FIG. 4 is the structure block diagram of a device for controlling mode switching of a hybrid electric vehicle.

Based on the same inventive concept, the embodiments of the present disclosure further provides a device 40 for controlling mode switching of a hybrid electric vehicle, which is used to implement the steps of the method for controlling mode switching provided by the above method embodiments. The device 40 for controlling mode switching can realize the vehicle control unit on the hybrid electric vehicle in software, hardware or a combination of both. As shown in FIG. 4, the device 40 includes:

a vehicle control unit 41, configured for acquiring a current drive state information of the hybrid electric vehicle;

a processor 42, configured for performing, if the drive state information indicates that a current drive mode of the hybrid electric vehicle is a forward mode of a non-hybrid drive and in a case that a current speed reaches a speed limit, a pre-gear operation when a transmission gear of the hybrid electric vehicle is a neutral gear, to switch the transmission gear from the neutral gear to a second gear; and a transmission control unit 43, configured for switching, if the drive state information meets preset switching conditions of drive modes, the hybrid electric vehicle from the non-hybrid drive mode to a hybrid drive mode when the transmission gear of the hybrid electric vehicle is the second gear.

With the above device 40 for controlling mode switching, the present disclosure is provided with a speed limit, except that the transmission gear is shifted from the neutral gear to a higher gear when the mode is switched to the hybrid mode. When the vehicle speed reaches the speed limit, the vehicle control unit sends out a pre-gear command, and the synchronizer is shifted from the neutral gear to the second gear. After the gear shifting is completed, if the drive demand of the vehicle meets the conditions for switching to the hybrid drive mode, the mode switching can be completed without controlling the synchronizer to shift the gear only by engaging the clutch, which avoids the mode switching being blocked due to the limitation of the ability of the synchronizer during the mode switching and synchronizer engaging when the vehicle speed is too high, which can not only meet the driving needs of the driver, but also improve the use economy of the vehicle as much as possible.

In an embodiment, the step of acquiring, through the vehicle control unit 41, a current drive state information of the hybrid electric vehicle includes:

determining a current drive mode of the hybrid electric vehicle and a gear information under the current drive mode according to an electric signal of the transmission control unit; and determining a current vehicle speed and a current vehicle demand power of the hybrid electric vehicle according to an electric signal of the electronic stability program, wherein the drive state information comprises the current drive mode, the gear information, the current vehicle speed and the current vehicle demand power, and the current vehicle demand power is configured to determine whether a current vehicle needs to switch to the hybrid drive mode;

the switching conditions of drive modes are that the drive state information indicates that the hybrid electric vehicle is in the forward mode of the non-hybrid drive, a current vehicle speed is in a preset speed range, and a current vehicle demand power is in an economic operation range.

In an embodiment, the step of performing, through the processor 42, a pre-gear operation includes:

sending a pre-gear command to the transmission control unit, the pre-gear command is configured to instruct the transmission control unit to control the synchronizer to perform the pre-gear operation.

In an embodiment, the processor 42 is further configured for re-sending the pre-gear command to the transmission control unit when a gear failure message sent by the transmission control unit in response to the pre-gear command is received.

In an embodiment, the speed limit of the vehicle with the device 40 is determined by:

acquiring a preset maximum speed difference in a synchronizer of the hybrid electric vehicle; and setting the speed limit according to the maximum speed difference, such that when the vehicle speed of the hybrid electric vehicle reaches the speed limit, a speed difference at both ends of the synchronizer is less than the maximum speed difference.

In an embodiment, the step of switching, through the transmission control unit 43, the hybrid electric vehicle from the non-hybrid drive mode to a hybrid drive mode includes:

sending a mode switching command to the transmission control unit, and the mode switching command is configured to instruct the transmission control unit to control an engagement of the clutch with an engine of the hybrid electric vehicle to complete an operation of switching from a pure electric drive mode or a series drive mode to a hybrid electric drive mode.

In an embodiment, the transmission control unit 43 is further configured for:

performing, if the drive state information indicates that the current drive mode of the hybrid electric vehicle is the hybrid drive mode and a current speed of the hybrid electric vehicle is less than the speed limit, a reverse gear operation when the transmission gear of the hybrid electric vehicle is the second gear, to switch the transmission gear from the second gear to the neutral gear.

Figure 5:
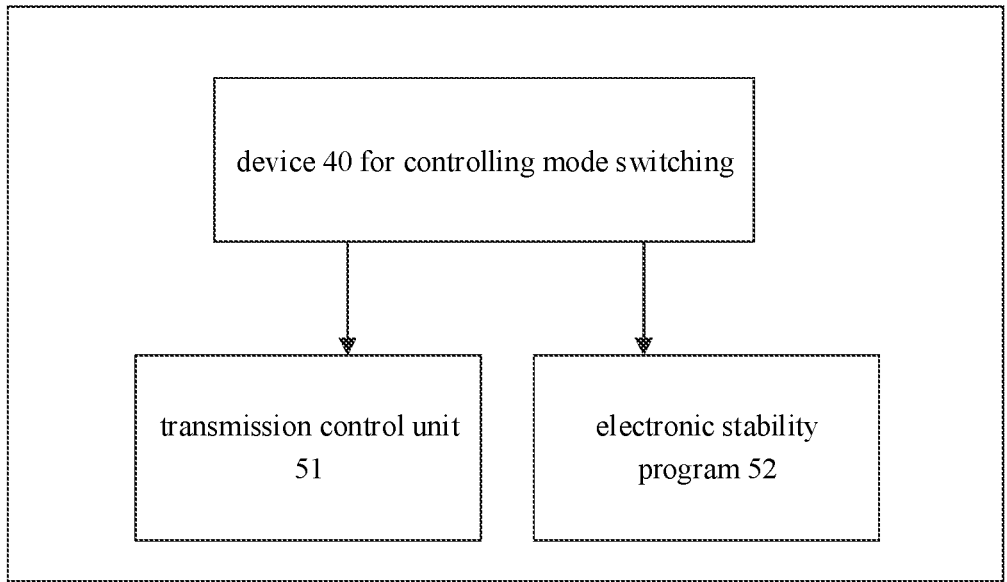
FIG. 5 is the block diagram of a hybrid electric vehicle.

Based on the same inventive concept, as shown in FIG. 5, the embodiment of the present disclosure further provides a hybrid vehicle 50, which includes a transmission control unit 51, an electronic stability program 52, and a device 40 for controlling mode switching electrically connected with the transmission control unit 51 and the electronic stability program 52. The device 40 for controlling mode switching is used to implement the method for controlling mode switching of a hybrid electric vehicle. Those skilled in the art should know that, in specific implementation, the hybrid electric vehicle further includes other components. FIG. 5 only shows the components related to the embodiments of the present disclosure, and other necessary vehicle components are not shown.

The embodiments of the present disclosure have been described in detail above in combination with the accompanying drawings. However, the present disclosure is not limited to the specific details of the above embodiments. Within the scope of the technical concept of the present disclosure, a variety of simple modifications can be made to the technical solution of the present disclosure, which belongs to the scope of protection of the present disclosure. For example, a speed limit of 105 kph can be changed to a speed limit of 120 kph.

Although the present invention has been disclosed in the form of embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

What is claimed is:

1. A method for controlling mode switching of a hybrid electric vehicle, comprising:

acquiring, though a vehicle control unit, a current drive state information of the hybrid electric vehicle;

performing, through a processor, if the current drive state information indicates that a current drive mode of the hybrid electric vehicle is a forward mode of a non-hybrid drive mode and in a case that a current speed reaches a speed limit, a pre-gear operation when a transmission gear of the hybrid electric vehicle is a neutral gear, to switch the transmission gear from the neutral gear to a second gear; and switching, though a transmission control unit, if the current drive state information meets preset switching conditions of drive modes, the hybrid electric vehicle from the non-hybrid drive mode to a hybrid drive mode when the transmission gear of the hybrid electric vehicle is the second gear;

wherein the speed limit is determined by:

acquiring a preset maximum speed difference in a synchronizer of the hybrid electric vehicle, wherein the preset maximum speed difference is a limit to a speed difference at both ends of the synchronizer, and the preset maximum speed difference is defined by an ability of the synchronizer; and setting the speed limit according to the preset maximum speed difference, such that when a vehicle speed of the hybrid electric vehicle reaches the speed limit, a speed difference at both ends of the synchronizer is less than the preset maximum speed difference;

wherein the hybrid electric vehicle comprises the transmission control unit, a synchronizer electrically connected with the transmission control unit, and a clutch electrically connected with the transmission control unit; and the pre-gear operation allows the vehicle to perform the pre-gear operation when the vehicle reaches the speed limit, and when the vehicle speed is higher than the speed limit and the vehicle is necessary to switch to the hybrid power drive mode, the synchronizer has been in gear, and the clutch can be directly engaged.

2. The method according to claim 1, further comprising:

performing, through the transmission control unit, if the current drive state information indicates that the current drive mode of the hybrid electric vehicle is the hybrid drive mode and a current speed of the hybrid electric vehicle is less than the speed limit, a reverse gear operation when the transmission gear of the hybrid electric vehicle is the second gear, to switch the transmission gear from the second gear to the neutral gear.

3. The method according to claim 1, wherein the hybrid electric vehicle comprises the transmission control unit and an electronic stability program, and the step of acquiring the current drive state information of the hybrid electric vehicle comprising:

determining a current drive mode of the hybrid electric vehicle and a gear information under the current drive mode according to an electric signal of the transmission control unit; and determining a current vehicle speed and a current vehicle demand power of the hybrid electric vehicle according to an electric signal of the electronic stability program, wherein the drive state information comprises the current drive mode, the gear information, the current vehicle speed and the current vehicle demand power, and the current vehicle demand power is configured to determine whether a current vehicle needs to switch to the hybrid drive mode;

wherein the switching conditions of drive modes are that the drive state information indicates that the hybrid electric vehicle is in the forward mode of the non-hybrid drive mode, a current vehicle speed is in a preset speed range, and a current vehicle demand power is in an economic operation range.

4. The method according to claim 1, wherein the hybrid electric vehicle comprises an electronic stability program, and the step of performing a pre-gear operation comprises:

sending a pre-gear command to the transmission control unit, wherein the pre-gear command is configured to instruct the transmission control unit to control the synchronizer to perform the pre-gear operation.

5. The method according to claim 4, further comprising:

re-sending the pre-gear command to the transmission control unit when a gear failure message sent by the transmission control unit in response to the pre-gear command is received.

6. The method according to claim 1, wherein the step of switching the hybrid electric vehicle from the non-hybrid drive mode to the hybrid drive mode comprises:

sending a mode switching command to the transmission control unit, wherein the mode switching command is configured to instruct the transmission control unit to control an engagement of a clutch with an engine of the hybrid electric vehicle to complete an operation of switching from a pure electric drive mode or a series drive mode to a hybrid electric drive mode.

7. A device for controlling mode switching of a hybrid electric vehicle, the device comprising:

an acquisition module, configured for acquiring, through a vehicle control unit, a current drive state information of the hybrid electric vehicle;

a processing module, configured for performing, through a processor, if the current drive state information indicates that a current drive mode of the hybrid electric vehicle is a forward mode of a non-hybrid drive mode and in a case that a current speed reaches a speed limit, a pre-gear operation when a transmission gear of the hybrid electric vehicle is a neutral gear, to switch the transmission gear from the neutral gear to a second gear; and a switching module, configured for switching, through a transmission control unit, if the current drive state information meets preset switching conditions of drive modes, the hybrid electric vehicle from the non-hybrid drive mode to a hybrid drive mode when the transmission gear of the hybrid electric vehicle is the second gear;

wherein the speed limit is determined by:

acquiring a preset maximum speed difference in a synchronizer of the hybrid electric vehicle, wherein the preset maximum speed difference is a limit to a speed difference at both ends of the synchronizer, and the preset maximum speed difference is defined by an ability of the synchronizer; and setting the speed limit according to the preset maximum speed difference, such that when a vehicle speed of the hybrid electric vehicle reaches the speed limit, a speed difference at both ends of the synchronizer is less than the preset maximum speed difference;

wherein the hybrid electric vehicle comprises the transmission control unit, a synchronizer electrically connected with the transmission control unit, and a clutch electrically connected with the transmission control unit; and the pre-gear operation allows the vehicle to perform the pre-gear operation when the vehicle reaches the speed limit, and when the vehicle speed is higher than the speed limit and the vehicle is necessary to switch to the hybrid power drive mode, the synchronizer has been in gear, and the clutch can be directly engaged.

8. The device according to claim 7, wherein the transmission control unit is further configured for:

performing, if the current drive state information indicates that the current drive mode of the hybrid electric vehicle is the hybrid drive mode and a current speed of the hybrid electric vehicle is less than the speed limit, a reverse gear operation when the transmission gear of the hybrid electric vehicle is the second gear, to switch the transmission gear from the second gear to the neutral gear.

9. The device according to claim 7, wherein the hybrid electric vehicle comprises an electronic stability program, and the vehicle control unit is further configured for:
determining a current drive mode of the hybrid electric vehicle and a gear information under the current drive mode according to an electric signal of the transmission control unit; and
determining a current vehicle speed and a current vehicle demand power of the hybrid electric vehicle according to an electric signal of the electronic stability program, wherein the current drive state information comprises the current drive mode, the gear information, the current vehicle speed and the current vehicle demand power, and the current vehicle demand power is configured to determine whether a current vehicle needs to switch to the hybrid drive mode;
wherein the switching conditions of drive modes are that the current drive state information indicates that the hybrid electric vehicle is in the forward mode of the non-hybrid drive mode, a current vehicle speed is in a preset speed range, and a current vehicle demand power is in an economic operation range.

10. The device according to claim 7, the hybrid electric vehicle comprises an electronic stability program, and the processor is configured for:
sending a pre-gear command to the transmission control unit, wherein the pre-gear command is configured to instruct the transmission control unit to control the synchronizer to perform the pre-gear operation.

11. The device according to claim 10, wherein the processor is further configured for:
re-sending the pre-gear command to the transmission control unit when a gear failure message sent by the transmission control unit in response to the pre-gear command is received.

12. The device according to claim 7, wherein the transmission control unit is configured for:
sending a mode switching command to the transmission control unit, wherein the mode switching command is configured to instruct the transmission control unit to control an engagement of the clutch with an engine of the hybrid electric vehicle to complete an operation of switching from a pure electric drive mode or a series drive mode to a hybrid electric drive mode.

13. A hybrid electric vehicle, comprising: a transmission control unit, an electronic stability program and a device for controlling mode switching electrically connected with the transmission control unit and the electronic stability program, and the device for controlling mode switching is configured for implementing a method comprising:
acquiring, though a vehicle control unit, a current drive state information of the hybrid electric vehicle;
performing, through a transmission control unit, if the current drive state information indicates that a current drive mode of the hybrid electric vehicle is a forward mode of a non-hybrid drive mode and in a case that a current speed reaches a speed limit, a pre-gear operation when a transmission gear of the hybrid electric vehicle is a neutral gear, to switch the transmission gear from the neutral gear to a second gear; and
switching, though the vehicle control unit, if the current drive state information meets preset switching conditions of drive modes, the hybrid electric vehicle from the non-hybrid drive mode to a hybrid drive mode when the transmission gear of the hybrid electric vehicle is the second gear;
wherein the speed limit is determined by:
acquiring a preset maximum speed difference in a synchronizer of the hybrid electric vehicle, wherein the preset maximum speed difference is a limit to a speed difference at both ends of the synchronizer, and the preset maximum speed difference is defined by an ability of the synchronizer; and
setting the speed limit according to the preset maximum speed difference, such that when a vehicle speed of the hybrid electric vehicle reaches the speed limit, a speed difference at both ends of the synchronizer is less than the preset maximum speed difference;
wherein the hybrid electric vehicle comprises the transmission control unit, a synchronizer electrically connected with the transmission control unit, and a clutch electrically connected with the transmission control unit; and
the pre-gear operation allows the vehicle to perform the pre-gear operation when the vehicle reaches the speed limit, and when the vehicle speed is higher than the speed limit and the vehicle is necessary to switch to the hybrid power drive mode, the synchronizer has been in gear, and the clutch can be directly engaged.

14. The method according to claim 2, wherein the hybrid electric vehicle comprises and the step of performing a pre-gear operation comprising:
sending a pre-gear command to the transmission control unit, wherein the pre-gear command is configured to instruct the transmission control unit to control the synchronizer to perform the pre-gear operation.

15. The method according to claim 3, wherein the hybrid electric vehicle comprises an electronic stability program, and the step of performing a pre-gear operation comprising:
sending a pre-gear command to the transmission control unit, wherein the pre-gear command is configured to instruct the transmission control unit to control the synchronizer to perform the pre-gear operation.

16. The method according to claim 2, wherein the step of switching the hybrid electric vehicle from a non-hybrid drive mode to a hybrid drive mode comprising:
sending a mode switching command to the transmission control unit, wherein the mode switching command is configured to instruct the transmission control unit to control an engagement of the clutch with an engine of the hybrid electric vehicle to complete an operation of switching from a pure electric drive mode or a series drive mode to a hybrid electric drive mode.

* * * * *